United States Patent [19]
Launay

[11] 3,785,421
[45] Jan. 15, 1974

[54] SYSTEMS CONSTITUTED BY CAGE-NUTS AND THEIR CAGES

[75] Inventor: Pierre Launay, Samois-sur-Seine, France

[73] Assignee: Compagnie de Materiel et d'Equipements Techniques C.O.M.E.T., Senlis, France

[22] Filed: Mar. 30, 1972

[21] Appl. No.: 239,499

Related U.S. Application Data

[63] Continuation-in-part of Ser. No. 885,863, Dec. 17, 1969, abandoned.

[30] Foreign Application Priority Data
May 5, 1971 France .............................. 7116257

[52] U.S. Cl. ............................................. 151/41.75
[51] Int. Cl. ............................................ F16b 39/00
[58] Field of Search ..................... 151/41.75, 41.76, 151/41.7, 69, 68, 38, 7; 85/80, 1 JP, DIG. 2, 32 K, 71

[56] References Cited
UNITED STATES PATENTS

| | | |
|---|---|---|
| 1,889,807 | 12/1932 | Lee .................................. 85/32 K X |
| 2,455,145 | 11/1948 | Swanstrom ....................... 151/41.76 |
| 2,788,047 | 4/1957 | Rapata ..................................... 85/80 |
| 2,918,841 | 12/1959 | Poupitch ................................ 85/71 |
| 3,143,916 | 8/1964 | Rice ............................. 151/41.75 X |
| 3,398,496 | 8/1968 | Mischke ....................... 151/41.75 X |
| 3,413,886 | 12/1968 | Proctor .............................. 85/80 X |

Primary Examiner—Ramon S. Britts
Attorney—Eric H. Waters et al.

[57] ABSTRACT

A lug nut is held and guided by a plastic cage formed by a flanged bush, whose cylindrical part has longitudinal apertures in which the lugs slide axially and bosses at right angles to the apertures adjacent the flange. This assembly can be inserted from one side of a sheet into a corresponding slotted hole in the sheet, and on turning through 90° is locked angularly by seating the bosses in the slots. The bush is of nylon and has an annular rib on a surface of the flange to seal the device against the sheet. The bush can have a radial protuberance and ramps on the bosses to prevent inadvertent extraction from the hole. The flange can overlap the cylindrical wall of the bush radially inwardly to form a guiding and sealing hole for the bolt to be engaged in the lug nut.

13 Claims, 10 Drawing Figures

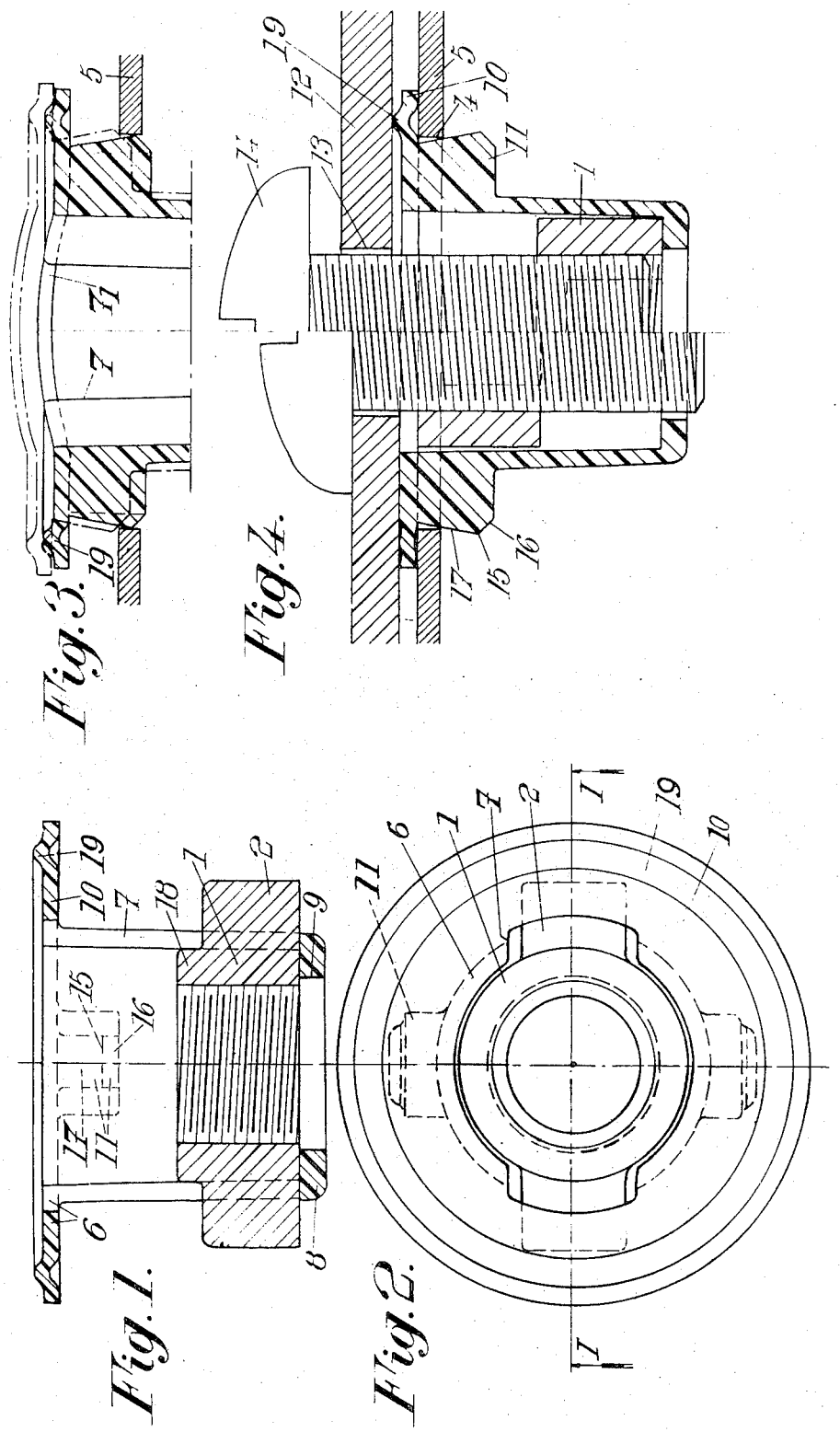

PATENTED JAN 15 1974 3,785,421

SYSTEMS CONSTITUTED BY CAGE-NUTS AND THEIR CAGES

This application is a continuation-in-part of my copending application Ser. No. 885,863 filed Dec. 17, 1969, now abandoned.

The present invention relates to systems constituted by cage nuts and their cages which are adapted to be positioned in a hole in a sheet from one surface of the sheet and intended to receive bolts introduced from this same surface, particularly when the other surface of the sheet is inaccessible, for example, if the sheet forms a part of a closed or partially closed box.

It relates more particularly still to such systems, comprising:

a lug nut adapted to cooperate with a slotted hole pierced in the sheet at the desired place, and a holding and guiding cage adapted to be mounted also in this hole, said cage having: longitudinal openings adapted to cooperate with the lugs of the nut by enabling axial but not angular displacements of the latter; stop elements limiting the penetration of this cage into the hole; and angular locking elements adapted to cooperate with the slots of the hole after the axial introduction of the cage furnished with the nut into this hole, then angular displacement of this cage, preferably by 90°.

Such systems have been described in particular in the second addition No. 61,552 filed 5 Apr. 1951 and issued 24 Nov. 1954 to principal French Pat. No. 1,008,903 filed in the same name 20 Jan. 1950 and issued 27 Feb. 1952.

In these known systems, the cages were constituted by stamping a portion of a thin sheet previously cut out in a star, each cage forming thus a sort of corolla of which the various petals had the free end curved outwardly. Two of these petals were especially deformed so as to be able to penetrate into slots of the slotted hole for the purpose of angular locking of the cage, after introduction of this latter, provided with a nut, into this hole, then rotation of the assembly by a quarter of a turn.

These constructions, in spite of certain advantages, had the following drawbacks:

Lack of sealing of the assemblies produced, by reason of the presence of openings between the various constituent petals of the cage and especially between their curved ends distributed annularly and clamped between the sheet and the assembled part.

Creation of noises or whistles by the penetration of air into these openings, even if of very small transverse section, when assemblies equipped with these cage nuts are moved at high speed, for instance, when the assemblies constitute automobiles or aircraft.

Risk of the assembled cages becoming prematurely loosened from their holes, that is to say before the assembly for which they are intended is completed, nothing preventing, through vibrational or the like, each cage from being displaced first axially in the direction of extraction from the hole (which unlocks them angularly), then from turning around its axis by a quarter of a turn, which enables its axial extraction with the nut from the hole by simple translation.

It is an object of the invention to overcome these drawbacks by ensuring the sealing and the silence of the assemblies produced by the aid of such systems and preferably also automatic axial locking of the cages comprised by these systems after their positioning.

It is another object of the invention to render nut-cage systems of the type concerned such that they respond to the various exigencies of practice better than hitherto, especially as regards the torsion resistance of the bushes, the guidance mount the screws or bolts, the fluid-tightness and the resistance unscrewing of the resulting screwed assemblies.

Other objects and advantages will become apparent from the description which follows.

The invention consists, principally, in constituting the cage of a system of the type in question by a cylindrical thin-walled longitudinally cloven bush formed of moulded plastics material (especially of nylon) and joined at one of its ends to a continuous external flange, angular locking elements of this system being constituted by solid bosses moulded with this bush.

According to another feature of the invention the continuous flange comprised by the bush of the system is made to overlap radially the cylindrical wall of the bush, not only towards the outside of the latter, but also towards the inside, this collar being cut-out centrally by a circular hole whose diameter is substantially equal to the internal diameter of the nut.

This diameter is preferably less than the outer diameter of the threads of the bolts or screws intended to cooperate with the nut, being advantageously equal to the diameter of the bottom of the thread of these bolts, that is, to the smallest inner diameter of the threaded portion of said nut.

In addition, in preferred embodiments the bottom of the bush, situated axially opposite the end where the flange is situated, is entirely eliminated so as to render possible the axial extraction of a central molding mandrel through said bottom end of the bush.

The invention comprises, apart from these main features, certain other features which are preferably used at the same time and which will be more explicitly considered below.

In order that the invention may be more fully understood, several embodiments of systems according to the invention are described below, purely by way of illustrative and non-limiting example, with the aid of the accompanying drawings in which:

FIGS. 1 and 2, show respectively in axial cross-section along l–l, FIG. 2, and in end view a cage nut-cage system constructed according to the invention;

FIG. 3 illustrates a phase of the assembly of this system on a sheet;

FIGS. 4 and 5 show along two axial sections perpendicular to one another the assembly constituted by such a system, a part of the sheet on which it is mounted, a bolt cooperating with it and a portion of the part assembled on the sheet, the right half of FIG. 4 corresponding to the beginning of screwing;

Figure 6:
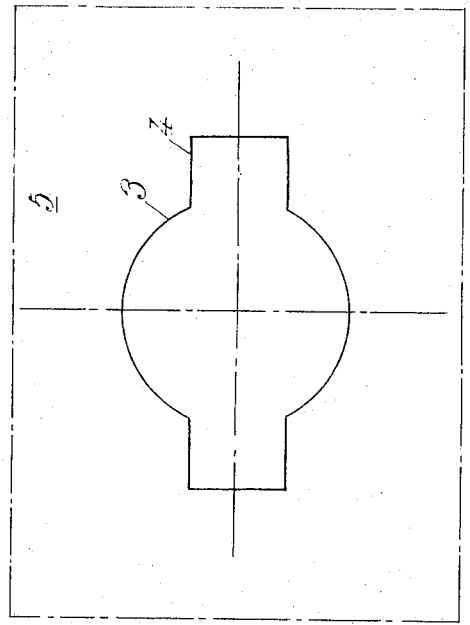
FIG. 6 shows the shape of a slotted hole formed in a sheet and adapted to receive the above system.

In order to mount a cage nut in a sheet from the same surface from which will be introduced the bolts intended to cooperate with this nut for the purposes of assembling suitable parts on this sheet, procedure is generally as follows.

In a manner known in itself, for example from the patent of addition mentioned above, recourse is had:

On one hand, to a nut 1 comprising at least two lugs 2 adapted to pass with slight play through a hole 3 with slots 4 pierced in the portion of the sheet 5 on which it is desired to amount this nut, mount On the other hand to a cage 6 pierced with longitudinal openings 7 extending over the whole height of this cage and in which the lugs of the nut are guided without the nut being rotatable, the thickness of the wall of this cage being small enough for it to be housed between the nut 1 and the hole 3.

According to the invention, instead of constituting this cage 6 by a sheet cut out as a star and folded, as in the known systems, it is constituted by a cylindrical thin-walled bush 6 pierced with longitudinal openings 7 extending substantially over the whole height of this cage and in which the lugs of the nut are guided without the nut being rotatable, the radial thickness of the wall of this bush being fairly small (for example from 0.3 mm to 0.8 mm) so that it can be housed between the nut 1 and the hole 3. The thinness of the wall enables, for a wall of given diameter, the use of bolts of relatively large diameters, which avoids unnecessary weakening of the assembly on sheet metal.

Said cage has a bottom 8 pierced by a hole 9 at least as large as the tapped hole of the nut, the edge of this hole preventing the nut from escaping. This cage is of moulded plastics material, for example of superpolyamide known under the name "Nylon," said bush comprising like the preceding ones longitudinal guidance openings 7 and a bottom 8 pierced by a hole 9, but terminating at its end opposite the bottom in a continuous external flange 10.

The angular locking elements are here constituted by solid bosses 11 obtained by moulding with the bush in positions displaced angularly by 90° with respect to the openings 7.

In the preferred embodiments shown, the flange has a radius greater than the largest radius of the slotted hole and hence covers the portion of largest radius of the slots. It has in addition at least one continuous rib 19, preferably annular, projecting axially on one and/or the other surface of this flange, the axial height of this rib being the same throughout the length of the latter.

The rib 19 can be provided at the periphery of the flange 10 or in an intermediate portion of this flange.

Several concentric ribs may be provided.

Each rib may be constituted by a local extra thickness of material (FIG. 7) or on the other hand by a local folding, which can be a folded back edge, of the flange, not corresponding to any local extra thickness (FIGS. 1 to 4).

The latter solution may be advantageous in the case where it is desired to limit the total thickness of the flange in its crushed state, the fold being clamped axially and in the limit completely flattened by tightening a bolt engaged in the nut, as will be seen below.

To produce an assembly with such a cage-nut system, the procedure is as follows:

the nut 1 being imprisoned in the bush 6, for example on moulding, the assembly of this bush provided with the nut is introduced into the slotted hole 3 until axial abutment of the bosses 11 against the edge of this hole, this assembly is then made to turn by a quarter of a turn and at the end of this displacement the bosses 11 penetrate axially into the slot 4, which ensures angular locking of the assembly.

The flange 10 is then applied contiguously against the edge of the hole.

On subsequent assembly of a panel or other part 12 on the sheet 5, it suffices simply to apply this part on this sheet 5 by placing opposite the hole 3 a hole 13 perforated in said part, then to screw a bolt 14 into the cage nut 1 through these two holes, which clamps the part 12 against the sheet 5 with the interposition of the flange 10 and crushing of the rib 19, which thus forms a sealing joint between the part 12 and the sheet 5.

The assembly obtained is particularly tight and silent.

It is advantageous to provide in addition on the bush, elements which ensure axial locking of the system mounted on the sheet, thus preventing inadvertant extraction of this system before its use.

In a first embodiment of this arrangement, illustrated in FIGS. 1 to 5, these elements are ramps externally bounding the bosses 11.

They are two in number for each boss, joined by a sharp edge 15 of maximum radius, namely:

a first ramp 16 adapted to cooperate at the beginning of the introduction of the cage into the hole 3 with the bottoms of the slots 4 thereby compressing the cage radially and progressively, as seen in FIG. 3, this compression being rendered possible by the presence of openings 7, with relatively flexible edges $7_1$, in the lateral surface of the bush, then a second ramp 17 of opposite slope to the first, the angle of slope of this second ramp on the axis of the cage being preferably smaller than that of the first one on this axis; this second ramp cooperating with a slot bottom 4 at the end of the axial introduction of the bush, which is manifested by an elastic radial expansion of the bush and hence by a certain elastic resistance to its subsequent axial extraction.

Such an axial extraction is not impossible, but it cannot be done involuntarily and requires a certain force.

If it is desired that the assembly of the cage be absolutely irreversible, it suffices to replace the second ramp 17 by an annular groove.

The axial dimension of this ramp or groove is preferably relatively large so that the same specimen may be utilized to assemble parts of various thicknesses.

Figure 7:
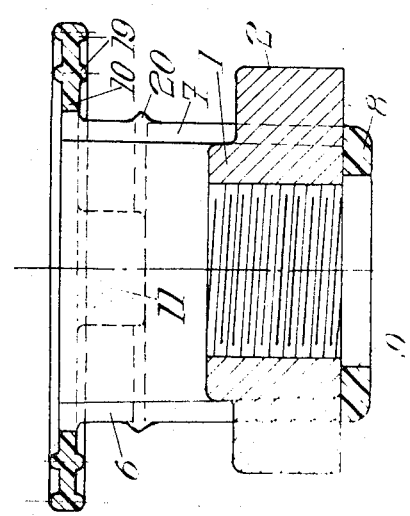
FIG. 7 shows similarly to FIG. 1 a variation of the cage nut-cage system constructed according to the invention.
Figure 5:
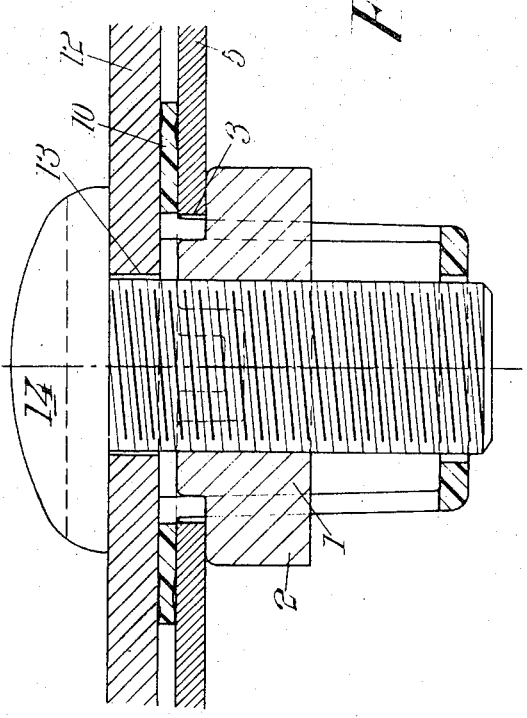

In a second embodiment of the said arrangement relative to axial locking, illustrated in FIG. 7, there is provided externally on the cylindrical skirt of the bust at least one annular protuberance 20 in the form of one or several ridges or, preferably, in the form of an annular beading composed actually of two arcs due to the presence of the openings 7.

The transverse section of the bush at the level of this protuberance 20 is slightly greater than that of the hole 3 concerned without its slots.

Accordingly, the axial introduction of the bush into this hole 3 necessitates a slight radial contraction of this bush (made possible by the elasticity of the constituent material of the bush and especially by the presence of the openings 7).

The elastic expansion which follows restores the transverse section concerned to its normal dilated form, which prevents subsequently any involuntary axial extraction of the bush from the hole.

It is to be noted that this locking is particularly effective with regard to attempts at axial extraction when a portion of the nut is positioned in the axial zone of the bush where the protuberance 20 occurs, since its presence in this zone then prevents any contraction of the aforesaid transverse section of the bush.

To enable mounting of the bush on sheets of various thicknesses, it is better if the protuberance is axially not too close to the flange.

However, its axial spacing from this flange is preferably limited by the possibility of extraction of the bosses 11 from the slots of the hole 3: to prevent such involuntary extraction, the axial distance between the protuberance 20 and the surface of the flange 10, turned towards it, is less than the sum of the thickness of the sheet 5 and the axial dimension of the bosses 11.

The lug-nut preferably comprises an annular beading 18 arranged on the opposite side to the cage bottom 8 and of which the external diameter is only slightly less than the internal diameter of the bush 6: this beading increases the length of threading for a given axial dimension of the lugs 2 and reduces the risks of deformation of the nut on maximum clamping.

Figure 8:
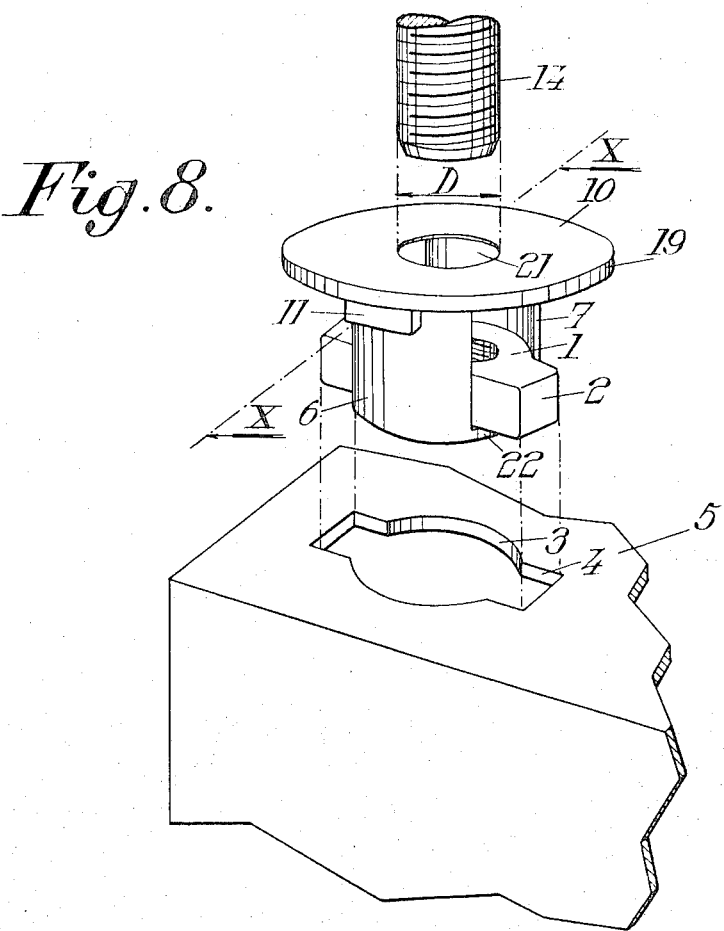
FIG. 8, shows in perspective view from slightly above, an embodiment of a cage nut-cage system according to the invention, arranged axially between a slotted hole cut-out in a sheet and adapted to receive this system and the threaded end of a screw intended to cooperate with the latter.
Figure 9:
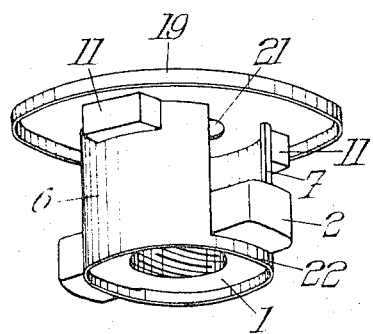
FIG. 9 shows the same system as in FIG. 8 in perspective view from slightly below.
Figure 10:
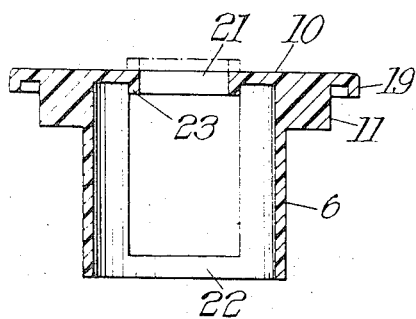
FIG. 10 shows in vertical section along the line III—III of FIG. 8, another embodiment of the cage.

In the embodiments shown in FIGS. 8 to 10, the screw is guided and preferably fluid-tight at the level of the flange.

To this end the flange 10 extends not only outwardly from the cylindrical wall of the bush 6 but also inwardly, so as to form a central circular opening 21 of relatively small diameter D.

This diameter D is slightly less than the greatest diameter of the threaded zone of the screw 14, which ensures contiguous contact between the edge of said opening 21 and said threaded zone.

The diameter D is preferably equal to that of the bottom of the thread of the screw 14, that is to say substantially to the diameter of the helix formed by the crests' of the thread of the mating nut 1.

In this way the edge of the opening 21 not only centers the screw 14 which passes through it (which guides the beginning of the axial penetration of the latter into the nut 1), but also ensures a certain fluid-tightness between the inside and the outside of the bush at the level of this edge.

The additional fluid-tightness thus ensured, which is added to that due to the clamping of the rib 19, if such is provided, is very substantial for certain applications and enables sealing washers, otherwise indispensable, to be often eliminated.

On its positioning, the screw 14 itself cuts a thread into the edge of the opening 21 capable of playing at the end of its tightening, the role of a lock nut.

This very advantageous role can be reinforced by thickening the said edge in one or both axial directions by an annular bead 23 (FIG. 10).

In order that the part of plastics material comprising the bush 6, the flange 20 and the bosses 11 may be obtained in a single unit by moulding, it is necessary to provide an outlet to disengage the central mandrel or the injection nozzle after moulding.

Since the reduction in the diameter of the opening 21 renders such a disengagement from the side of this opening impossible, it is provided for at the other axial end of the bush by entirely eliminating the annular bottom that this bush possesses at this other end in previous embodiments.

In summary, the bush now has the general shape of a hollow cylindrical skirt of which one axial end is connected at substantially the middle of the radial width of a flat washer, the other end of the skirt being freely open.

Of course the apertures 7 formed in the walls of the bush 6 do not extend axially entirely up to this open end: each of them is separated from this open end by a narrow bridge 22 which closes these apertures and thus renders the nut 1 truly "captive."

It may be considered that, with respect to previous embodiments, the new "cages" are distinguished by the "transfer" of an inner washer of plastics material from one end to the other of the bush.

Besides the advantages mentioned above as regards the guidance of the screws, the fluid-tightness and the resistance to unscrewing of the finished assembly, the improved construction has the advantage of greater resistance of the "cage" to the torsion to which it is subjected at the end of each tightening operation. It is in fact the zone which occurs in the immediate proximity of the said flange of this cage, which is subject to the said torsion at the end of tightening and not the open end of the bush.

As is self-evident, and as emerges already from the foregoing, the invention is in no way limited to those of its types of application and embodiments which have been more especially considered; it encompasses, on the contrary, all modifications.

I claim:

1. A cage nut-cage system for positioning on a sheet from one surface of the sheet to receive bolts introduced at said one surface, said system comprising: a lug nut having radially extending lugs and being adapted to cooperate with a slotted hole pierced in the sheet; and a holding and guiding cage adapted to be also mounted in said hole, said cage being constituted by a cylindrical thin-walled bush of a superpolyamide material, the radial thickness of the cylindrical wall of the bush being from 0.3 mm to 0.8 mm, said bush being cloven longitudinally by elongated apertures receiving said lugs of the nut and being adapted to cooperate with said lugs, to permit axial but not angular movement of the bush intended to seat against said one surface, and solid bosses rigidly fixed to said bush arranged to cooperate with the slots of said hole in order to lock the bush angularly after axial introduction of the bush furnished with the nut into said hole, followed by angular displacement of the bush, said lug nut having a tapped axial hole adapted to engage a corresponding thread on a said bolt and by screwing said bolt to clamp said flange in sealing manner against said one surface without distortion of the bush.

2. A cage nut-cage system according to claim 1, wherein at least one continuous rib projects axially on at least one surface of said flange.

3. A csge nut-cage system according to claim 2, wherein said rib is annular.

4. A cage nut-cage system according to claim 2, wherein said rib is constituted by a local fold of the flange.

5. A cage nut-cage system according to claim 4, wherein said rib is constituted by the fold back outer edge of the flange.

6. A cage nut-cage system, according to claim 1, wherein the bosses comprise inclined ramps adapted to co-act elastically with the bottoms of said slots at the beginning of their introduction into said slots, the portions of greatest diameter of said ramps being joined axially to portions of a smaller diameter adapted to co-act with said edges at the end of said introduction.

7. A cage nut-cage system according to claim 1, wherein the continuous flange overlaps radially the cylindrical wall of the bush, not only towards the outside of the wall, but also towards its inside, said flange being cut away centrally by a circular hole whose diameter is substantially equal to the internal diameter of the nut.

8. Cage nut-cage system according to claim 7, wherein the diameter of the central hole of the flange is less than the outer diameter of the threads of bolts or screws intended to cooperate with the nut.

9. Cage nut-cage system according to claim 8, wherein the diameter of the central hole of the flange is equal to the diameter at the bottom of the thread of said bolts or screws.

10. Cage nut-cage system according to claim 7, wherein the bottom of the bush, situated at the end axially opposite the end where the flange is positioned, is entirely eliminated so as to render possible the axial extraction of a central moulding mandrel through said bottom end of the bush.

11. Cage nut-cage system according to claim 7, wherein said circular hole is defined by a beaded edge protruding in at least one axial direction.

12. A cage nut-cage system for positioning on a sheet from one surface of the sheet to receive bolts introduced at said one surface, said system comprising: a lug nut having radially extending lugs and being adapted to cooperate with a slotted hole pierced in the sheet; and a holding and guiding cage adapted to be also mounted in said hole, said cage being constituted by a cylindrical thin-walled bush of plastics material cloven longitudinally by elongated apertures receiving said lugs of the nut and being adapted to cooperate with said lugs to permit axial but not angular movement of the nut, a continuous flange being joined to the outer end of the bush intended to seat against said one surface, and solid bosses rigidly fixed to said bush arranged to cooperate with the slots of said hole, in order to lock the bush angularly after axial introduction of the bush furnished with the nut into said hole, followed by angular displacement of the bush, said lug nut having a tapped axial hole adapted to engage a corresponding thread on a said bolt and by screwing said bolt to clamp said flange in sealing manner against said one surface without distortion of the bush, said thin cylindrical wall comprising at least one protuberance extending radially outwardly on the outer surface of said wall, the transverse section of the bush at the level of said protuberance being slightly greater than that of said slotted hole disregarding its slots, and the axial distance between said protuberance and the surface of the flange turned towards it, being less than the axial distance of the axially inner surface of said boss from said surface of the flange.

13. A cage nut-cage system, according to claim 12, wherein said protuberance has the shape of an annular beading composed of two arcs separated from one another by the apertures.

* * * * *

UNITED STATES PATENT OFFICE
CERTIFICATE OF CORRECTION

Patent No. 3,785,421　　　　　　　　Dated January 15, 1974

Inventor(s) Pierre Launay

It is certified that error appears in the above-identified patent and that said Letters Patent are hereby corrected as shown below:

On the cover sheet [30] insert the following:

-- Dec. 17, 1968　　　France　　　178664

Nov. 26, 1969　　　France　　　6940832 --.

Signed and sealed this 24th day of September 1974.

(SEAL)
Attest:

McCOY M. GIBSON JR.　　　　　　C. MARSHALL DANN
Attesting Officer　　　　　　　Commissioner of Patents

FORM PO-1050 (10-69)